Feb. 8, 1966 V. DAVIDOVIC 3,233,866
COOLED GAS TURBINES

Filed March 20, 1962 7 Sheets-Sheet 1

INVENTOR.
VLASTIMIR DAVIDOVIC
BY Robert W. Beach
ATTORNEY

Feb. 8, 1966    V. DAVIDOVIC    3,233,866
COOLED GAS TURBINES
Filed March 20, 1962    7 Sheets-Sheet 2
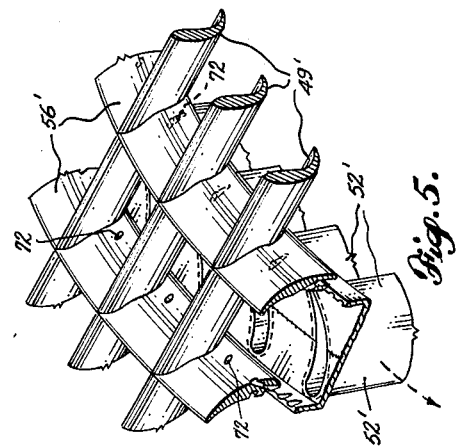
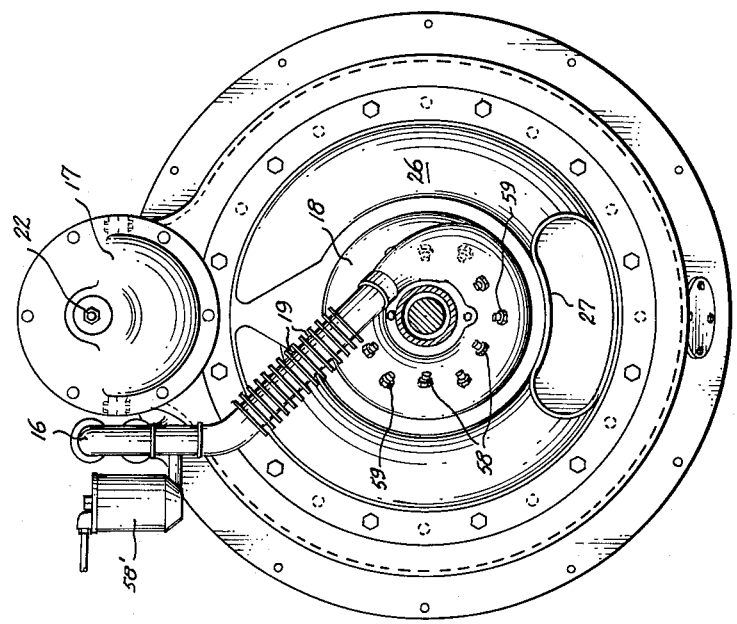
INVENTOR.
VLASTIMIR DAVIDOVIC
BY
Robert W. Beach
ATTORNEY

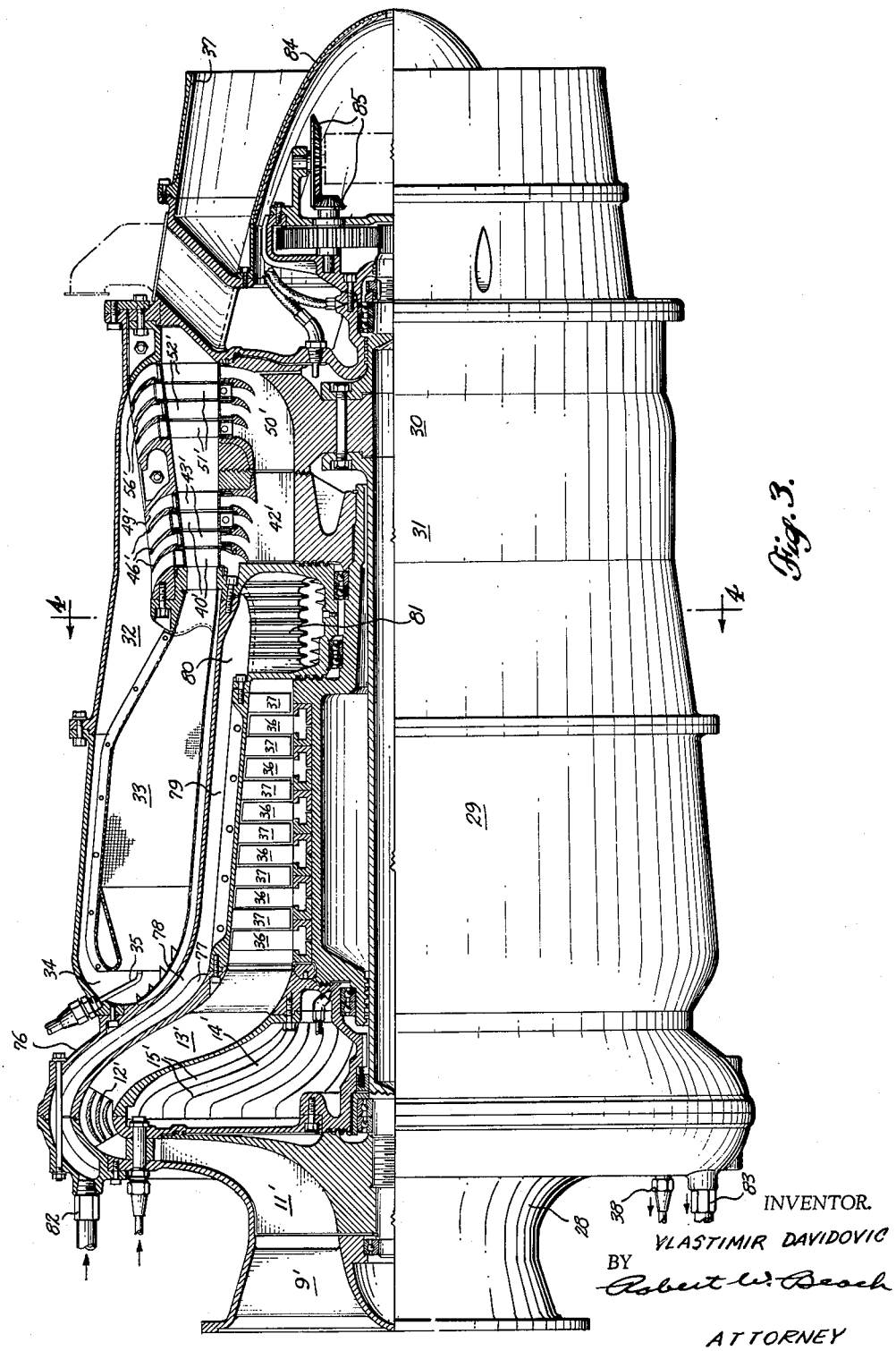

Feb. 8, 1966    V. DAVIDOVIC    3,233,866
COOLED GAS TURBINES

Filed March 20, 1962    7 Sheets-Sheet 4

INVENTOR.
VLASTIMIR DAVIDOVIC
BY
Robert W. Beach
ATTORNEY

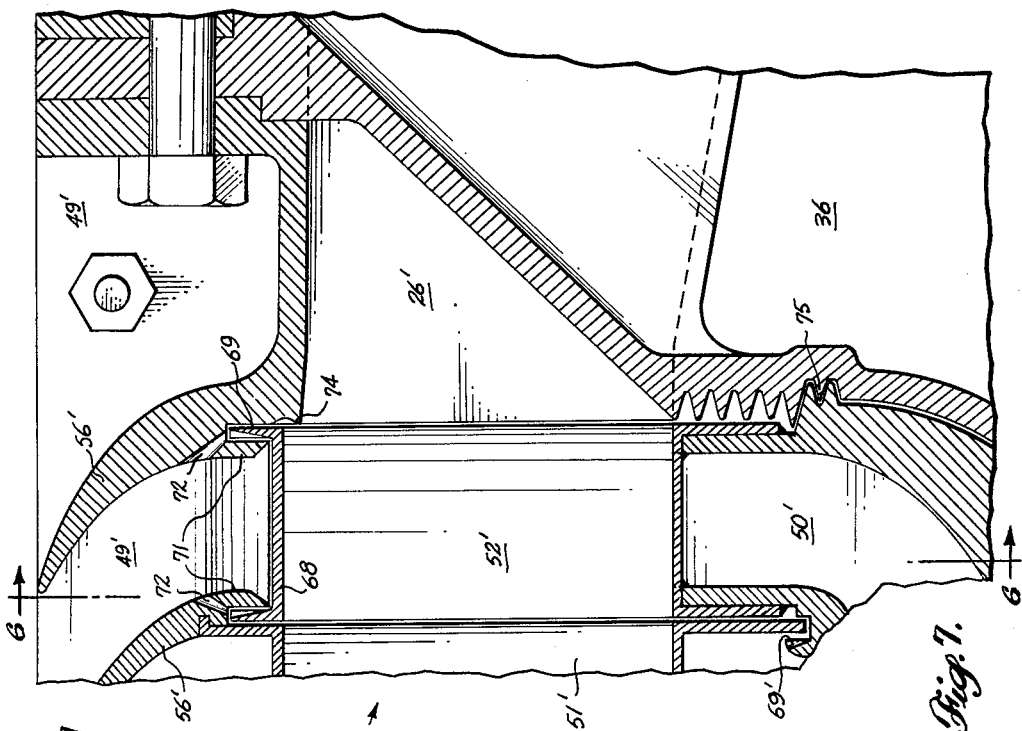
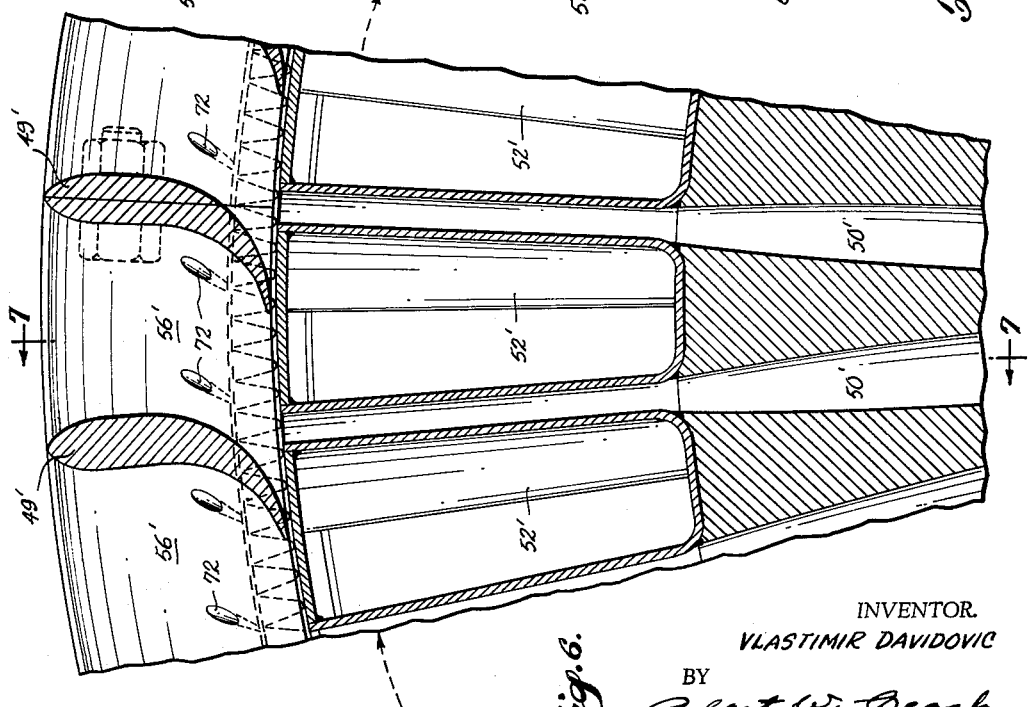
INVENTOR.
VLASTIMIR DAVIDOVIC
BY
ATTORNEY

Feb. 8, 1966    V. DAVIDOVIC    3,233,866
COOLED GAS TURBINES
Filed March 20, 1962    7 Sheets-Sheet 6
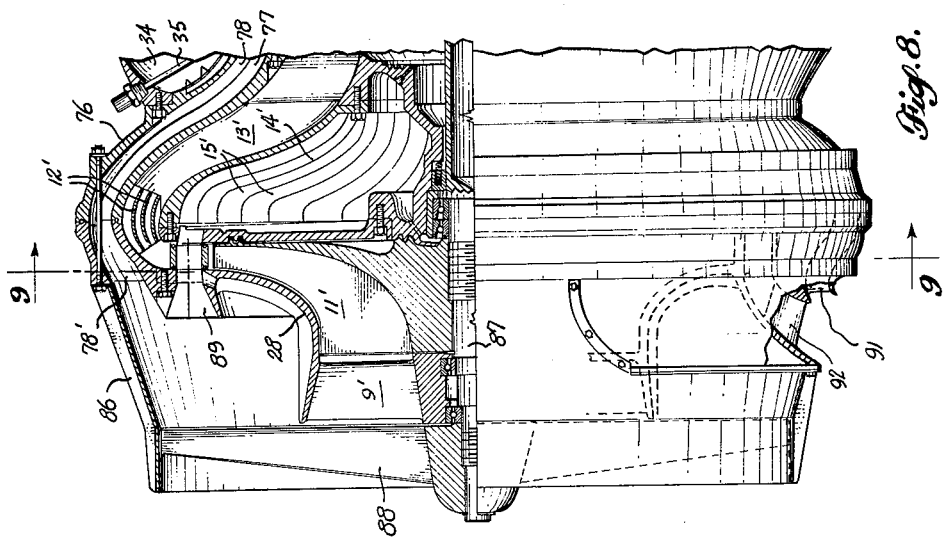
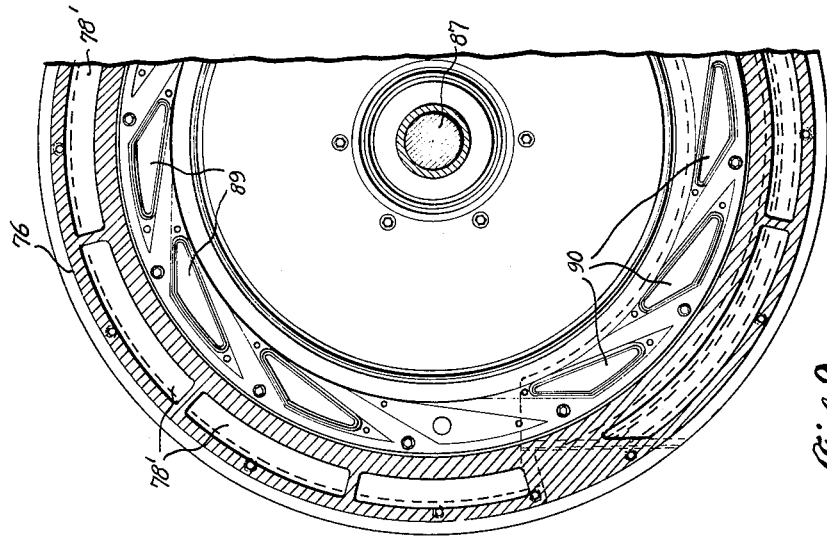
INVENTOR.
VLASTIMIR DAVIDOVIC
BY
Robert W. Beach
ATTORNEY Feb. 8, 1966 V. DAVIDOVIC 3,233,866
COOLED GAS TURBINES
Filed March 20, 1962 7 Sheets-Sheet 7

INVENTOR.
VLASTIMIR DAVIDOVIC
BY
Robert W. Beach
ATTORNEY

3,233,866
COOLED GAS TURBINES
Vlastimir Davidovic, 1921 12th Ave. S., Seattle, Wash.
Filed Mar. 20, 1962, Ser. No. 181,146
3 Claims. (Cl. 253—39.1)

This application is a continuation-in-part of the patent application in the name of Vlastimir Davidovic, Serial No. 758,212, filed September 2, 1958, now Patent No. 3,122,886, issued March 3, 1964, for Gas Turbine Cycle Improvement.

This invention relates to a gas turbine, and particularly to such a gas turbine which is cooled for the purpose of allowing less expensive materials to be used for parts which would otherwise be heated too highly, and to increase the thermal efficiency of the gas turbine.

A principal object is to utilize compressed air for cooling the turbine discs and both the rotary blades and the stationary blades of the turbine or turbines to enable these blades to be made of less expensive material than would otherwise be required, and to supply to the combustion chamber the air heated by such cooling. In this operation it is also an object to utilize virtually all of the air supplied to the combustion chamber for such turbine blade cooling purposes.

For increasing the cooling ability of the compressed air, it is an object to precool such air by the use of fluid flowing in heat exchange relationship to the compressed air, and such cooling fluid can be either air or liquid coolant.

In accomplishing the foregoing objects, it is an object to utilize light, simple, efficient and compact construction.

In cooling the last turbine stage it is an object, where desirable, to decrease the temperature to as low a value as practical for the purpose of reducing the operating loss of the gas turbine and increasing its efficiency, and such cooling can be effected by spraying liquid coolant into the airstream passing to the combustion chamber. Liquid of detergent character may be sprayed into the blade cooling airstream periodically, if desired, for the purpose of cleaning the passages through the hollow blades.

Another object is to improve the flow through the hollow stationary blades of a turbine, and to coordinate the flow through the hollow stationary and rotating blades of the turbine by locating the discharge passages from the stationary blades and from the moving blades in adjacent relationship, and forming them so that air discharged from the rotating turbine blades, which is accelerated by centrifugal force during such passage, will produce an aspirating effect on the air flowing through the hollow stationary blades and increase its velocity of flow.

In providing flow of cooling air through the hollow rotating blades of the turbine it is also an object to reduce leakage of blade-cooling air into the path of the turbine-propelling exhaust gas.

A further object is to provide an economical turbine blade structure for forming hollow rotary turbine blades through which cooling air can flow effectively.

An additional object is to increase the effectiveness of cooling the compressed air by passing it between two bodies of circulating cooling fluid. Also, if two compressors are utilized, it is an object to cool the air compressed by the second-stage compressor if it is advantageous to increase the turbine blade-cooling ability of the compressed air.

Another object is to add such compressed air to the combustion gas at the outlet of the combustion chamber to provide maximum combustion gas pressure and control turbine inlet temperature.

It is an object to be able to supply combustion gas to the turbine at a higher temperature than would otherwise be permissible for turbine blades made of a particular material, which increases the efficiency of the gas turbine operation, because of the internal cooling of both the rotary and stationary turbine blades.

A gas turbine having either a centrifugal compressor or an axial compressor, or compressors in combination can be used. Two turbines are employed, both the stationary and rotating blades of which are hollow, and air compressed by such compressor or compressors is conducted through the turbine discs and the stationary and rotating turbine blades, both to cool the discs and the blades and to heat the air. Preferably such compressed air, either during or after the compressing operation, moves through a passage in heat-exchange relationship with a cooling fluid chamber, which preferably is in the form of an envelope encircling the compressed air passage. Cooling fluid can also be supplied inwardly of the compressed air passage, and either or both of the cooling fluid chambers and the compressed air passage can be provided with fins or ribs to increase the effectiveness of heat exchange. To provide a large volume of cooling airflow through the moving and stationary blades of the turbine or turbines, such blades are made of sheet material, which can be forged, cast or stamped into the desired shape and assembled. The edges of the turbine rotors are formed as flanges fitting into grooves to provide a sealing labyrinth, and the flange edges are formed as blowers to impel outward air tending to flow into the path of combustion gas through the turbine. Jets are provided for discharge of supplemental liquid coolant or liquid detergent, or both, to the cooling air. A heat exchanger may be provided between the turbines and the discharge end of the exhaust pipe for transfer of further heat from the exhaust gas to preheat combustion air.

FIGURE 2 is an end elevation taken on line 2—2 of FIGURE 1.

FIGURE 3 is a side elevation with parts broken away of another type of gas turbine utilizing the invention, parts being broken away.

FIGURE 5 is a perspective of part of the internal structure showing the outlets from the turbine blade-cooling passages. FIGURE 6 is an enlarged transverse section through a portion of a turbine rotor and the adjacent stator structure, taken on line 6—6 of FIGURE 7, and FIGURE 7 is a longitudinal section on line 7—7 of FIGURE 6.

FIGURE 8 is a side elevation of the compressor section of a gas turbine showing an alternate type of construction, parts being broken away, and FIGURE 9 is a partial transverse section taken on line 9—9 of FIGURE 8.

FIGURE 10 is a side elevation of the central portion of the gas turbine of which FIGURE 8 shows a compressor section, parts being broken away.

Figure 1:
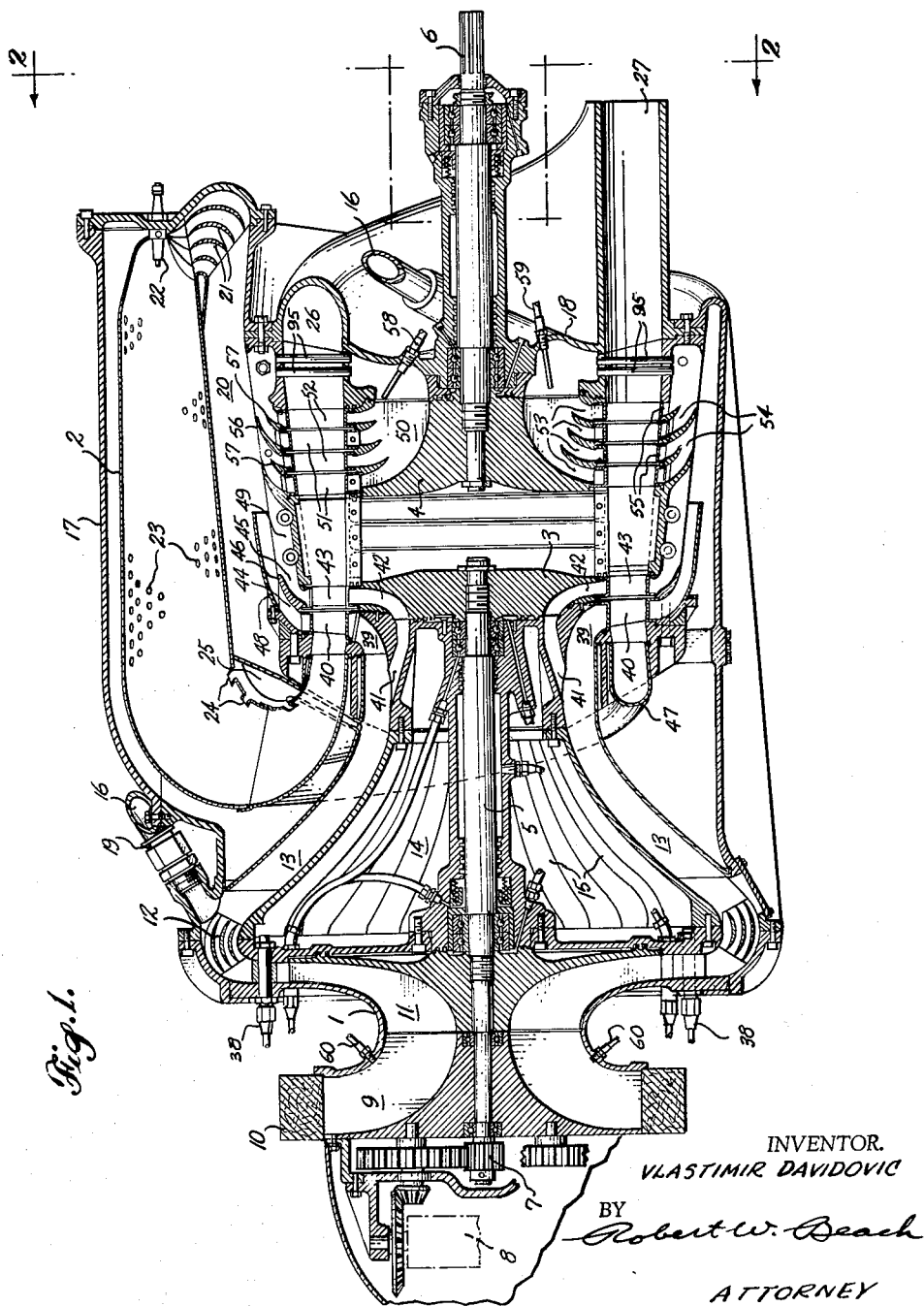
FIGURE 1 is a longitudinal section through one type of gas turbine construction provided with the invention.
Figure 11:
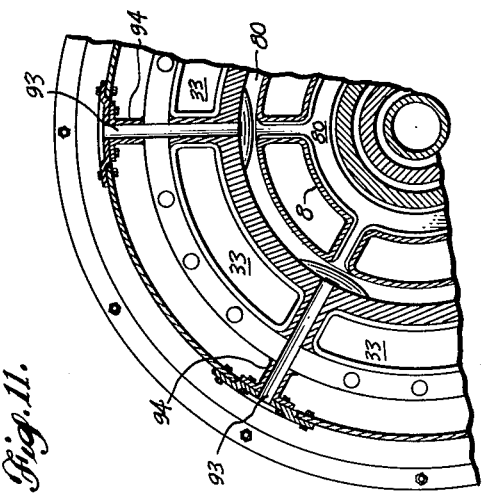
FIGURE 11 is a partial transverse section through such gas turbine on line 11—11 of FIGURE 10.

The gas turbine shown in FIGURES 1 and 2 is generally similar to the gas turbine of the earlier patent application Serial No. 758,212 mentioned above, now Patent No. 3,122,886, particularly as shown in FIGURE 2.

The gas turbine shown in FIGURES 1 and 2 includes a compressor 1, shown to be of the centrifugal type which supplies air under pressure to a combustion chamber or flame tube 2, the combustion gas from which drives the compressor turbine 3 and the power turbine 4. The compressor turbine is connected to the compressor by a drive shaft 5, and the power turbine 4 drives the output shaft 6. This gas turbine may be used either as a stationary power plant or to drive a vehicle such as an automotive vehicle, a boat, or even an airplane. For any of these uses the shaft 5 can be extended beyond the compressor 1 to carry a gear 7 which may be suitably connected to drive various accessories 8, such as magnetos, generators and pumps.

Air to be compressed is supplied to the compressor 1 through stationary inlet passages 9, the entrances to which may be covered by suitable filter material 10. The impeller 11 of the compressor by its rotation effects compression of the air flowing into the turbine in a ratio which, for example, may be approximately four to one. The outwardly flowing air discharged from the compressor is redirected by vanes 12 into the inwardly converging passages 13, which extend to the turbine 3. The inner walls of these passages or annular cross section passage are cooled by coolant in the coolant container 14. These walls may have inwardly projecting fins 15 to facilitate transfer of heat from the compressed air to the coolant. Such coolant is in liquid form, and may be fuel used to power the gas turbine.

Air from the passages 13 is used to cool the compressor turbine 3, and then flows on toward the inlet to the combustion chamber 2. Only part of the air compressed by the compressor 1 flows through the passages 13, part of the compressed air being bled off through a branch conduit 16 which extends alongside the casing 17 enclosing the combustion chamber, and is connected to an inner housing 18 alongside the turbine 4. The conduit 16 has circumferential fins 19 radiating heat conducted from the air flowing through the conduit 16 so that such compressed air is cooled during its passage from the turbine to the casing 18. From this casing 18 the air flows in cooling relationship to the power turbine 4 to the passage 20, where it merges with air from the passages 13 which has cooled the turbine 3. The compressed air flows from the passage 20 through the passages between the redirecting vanes 21 into the inlet end of the combustion chamber 2.

Fuel is supplied to the combustion chamber 2 in atomized form by the nozzle 22 and supplement air may flow into the combustion chamber in conventional fashion through apertures 23 in the combustion chamber wall. The discharge end of the combustion chamber is formed as a return bend, and the internally convex wall of this bend has in it passages 24 through which air can flow into the outlet end of the combustion chamber from a duct 25 connected to the passage 13, into which the compressed air is discharged from the compressor 1. Such duct receives compressed air which has been cooled by the coolant in the cooling container 14, so that such addition of air tends to reduce somewhat the temperature of the combustion gas and insures that the pressure of the combustion gas discharged from the combustion chamber is susbtantially equal to the pressure of the air discharged from the compressor 1. The combustion gas then flows through the compressor turbine 3 and the power turbine 4 to drive their rotors, and finally is discharged through the exhaust manifold 26 and the tail pipe 27.

Figure 4:
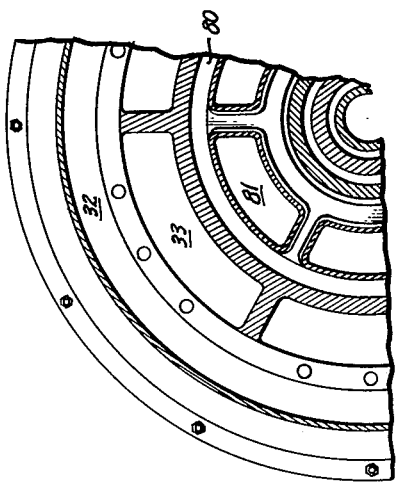
FIGURE 4 is a partial transverse section on line 4—4 of FIGURE 3.

Another representative type of gas turbine in which this invention is used is shown in FIGURES 3 and 4. This gas turbine has two compressors 28 and 29 arranged in series, which are driven respectively by two compressor turbines including the first-stage compressor turbine 30 driving the compressor 28 and the second-stage compressor turbine 31 driving the second compressor 29. The first compressor 28 has a centrifugal impeller 11′ which compresses air flowing into the inlet 9′ in the ratio of approximately four to one. The air thus compressed is redirected by vanes 12′ into a radially converging annular passage 13′ which may be divided into several passages by longitudinally extending radial planes, if desired.

From the passage 13′ the initially compressed air flows into the intake of the compressor 29, which is illustrated as being an axial compressor, the impeller of which has several rows of rotating blades 36 alternating with stationary blades 37. The compression ratio of such a compressor may be from four to one to ten to one, a representative compressor having a compression ratio of eight to one. The mass of compressed air delivered by the second compressor 29 will be greater than it otherwise would be because the air discharged from the compressor 28 is cooled substantially by an intercooler before it enters the second compressor 29. The air discharged from such second compressor may be cooled further at the outlet of this compressor, and then flows to the second-stage turbine 31 and the first-stage turbine 30 to cool them.

Figure 12:
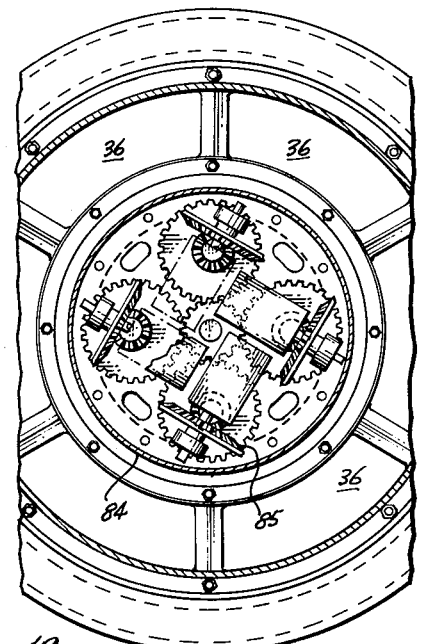
FIGURE 12 is a transverse section through the aft portion of a gas turbine, which may be of the type shown either in FIGURE 3 or in FIGURES 8 and 10, with parts broken away.

From the turbines 31 and 30 the compressed air flows through an annular passage 32 to the annular combustion chamber 33 by way of the intake 34. Into this intake fuel is projected in atomized form from the nozzle 35 to mix with the compressed air. The combustion chamber walls are perforated so that air may enter low pressure portions of the combustion chamber directly from the passage 32, instead of all the air entering through the entrance 34. The combustion gas from this combustion chamber flows first through the high speed turbine 31 and then through the low speed turbine 30 to drive their rotors, and is discharged through the passages 36 shown in FIGURE 12 and the tailpipe 37.

The provision for cooling the air compressed by the compressor or compressors and for using such compressed air to cool the blades of the turbine or turbines, according to the present invention can be accomplished in different ways and is illustrated in connection with the two representative types of gas turbine described above in connection with FIGURES 1 and 3. The cooling arrangement includes two principal features, first that of employing air compressed by one or more compressors to cool directly the blades of a turbine or turbines, and preferably both the stationary blades and the rotating blades of such turbine by flow through the hollow interior of such blades, and second, in order to increase the efficiency of the gas turbine generally and to increase the effectiveness of such turbine blade cooling, to cool such compressed air after it has been compressed, using either air or liquid coolant, and if it is compressed further by a second compressor, to cool such air further, either during or after such second compression, or both.

In the gas turbine of FIGURE 1 the air compressed by the centrifugal compressor 1 is cooled as it flows through the converging passage 13 by transference of heat to coolant in the coolant container 14, which is circulated through such container by suitable connections 38, by which coolant may be supplied to or withdrawn from the coolant container. Preferably such coolant is fuel supplied through the burner nozzle 22 to the combustion chamber, and such fuel therefore constitutes a heat sink. Because cooling of the compressed air results in reduction of the volume of compressed air to some extent if its pressure is maintained constant, the passage 13 is shown as contracting in cross-sectional area, although its radial width should be increased as its circumferential extent decreases as may be necessary to prevent the necessity of the air pressure being increased as it flows through the passage 13, because under such circumstances the compressed air would not flow through the passage readily, but such air would create an excessive back pressure on the compressor 1.

The compressed air thus cooled is divided as it reaches the compressor turbine 3 into a portion flowing through passages 39 which lead into passages extending radially through the stationary blades 40 of the turbine 3, and a portion flowing through passages 41 which lead into passages 42 within the rotor of the turbine 3 which curve from an axial direction into a radially outward direction to supply air to the radially extending passages through the interiors of the hollow rotary blades 43. From the stationary blades 40 the cooling air is discharged through passages 44 which are located adjacent to passages 45 in the stationary portion of the gas turbine body which surrounds the rotor 3. The passages 44 and 45 are separated by an annular divider 46.

Combustion gas discharged from the combustion chamber 2 passes through the turbine supply manifold 47 contracting circumferentially in volume toward the side of the gas turbine opposite the combustion chamber 2. From such manifold the combustion gas flows axially between the stationary blades 40 of the turbine 3, and then between the rotary blades 43 of the turbine rotor to exert a circumferentially directed rotating force on the rotor by the reaction of the combustion gas on these blades. The compressed air flowing radially through the turbine blades serves the dual purpose of keeping the temperature of such blades sufficiently low so that economical materials can be used for the construction of the blades and removing heat from the combustion gas for reheating the compressed air, which heat would otherwise largely be wasted in the discharge from the tailpipe 27 of combustion gas at comparatively high temperature.

An important feature of this turbine construction is the cooperative action between the compressed air flowing through the interior of the rotating blades and the compressed air flowing through the interior of the stationary turbine blades. During passage through the rotating blades 43 of the compressor turbine 3 in a radial direction the flow of the compressed air is accelerated by centrifugal action, and such increased velocity is maintained as the air discharged from the rotating turbine blades passes through the passages 45 adjacent to the passages 44. Since the blades 40 are stationary the flow of compressed air through their interiors normally would be produced only by the difference in pressure of the air between the passage 13 and the passage 20. The accelerated flow of air through the passages 45 produces an aspirating effect on the air in passages 44, however, so that the flow through such passages is accelerated. This effect is enhanced and the direction of airflow discharged from the passages 44 and 45 is controlled by provision of an annular shield 48 extending over the discharge openings of the passages 44 and 45, and directed toward the redirecting vanes 21. Rotational movement of compressed air discharged from the passages through the rotating blades 43 is deterred by providing axially extending dividers 49 intersecting the annular divider 46 to form an annular grid.

Compressed air conveyed by the passage or passages 13 flows only through the blades of compressor turbine 3. The blades of power turbine 4 are cooled by air passing through the branch conduit 16 leading from the compressor 1. Such compressed air is cooled by radiation of heat through the walls of the conduit, and dissipated by the circumferential fins 19 to the atmosphere. Such conduit can be made as large as required to supply an adequate amount of compressed cooling air to the annular casing 18 which distributes the air to passages 50 within the rotor of the power turbine. Such power turbine is illustrated as including two sets of stationary blades 51 and two sets of rotary blades 52. The passages 50 lead to radially discharging passages 53 through which the compressed cooling air is supplied in radial directions through the hollow radial passages extending through the fixed blades 51 and the hollow radial passages through the interiors of the rotating blades 52.

Air is discharged from the interiors of the fixed turbine blades 51 through passages 54, which are located alongside passages 55, respectively, through which air is discharged from the interiors of the rotating turbine blades 52. Each pair of passages 54 and 55 is separated from the other pair of such passages by a relatively wide annular divider 56, and the passages 54 and 55 of each pair are separated by a relatively narrow annular divider 57. All of these annular dividers are intersected by the axially extending dividers 49 which deter rotation of the air passing through the radial passages within the rotating turbine blades 52. The compressed air flowing through such rotating turbine blades is accelerated and maintenance of the increased velocity of such air flowing through the passages 55 produces an aspirating effect on the air flowing through the passages 54 from the interiors of the stationary blades 51 to facilitate the flow through such stationary blades.

The streams of air emerging from the passages 44, 45, 54 and 55 of the gridwork formed by the radial and axial dividers commingle in the annular chamber 20 and the reheated air flows between the redirecting vanes 21 into the combustion chamber 2. Reheating of the air passing through the internal passages of the stationary turbine blades 51 and the rotary turbine blades 52, as in the case of compressor turbine 3, serves the dual purpose of cooling the walls of the turbine blades to maintain their temperature sufficiently low so that economical material can be used for such blades. Also heat extracted from the combustion gas is utilized at a location adjacent to the inlet to the combustion chamber to reheat the compressed air provided to support combustion instead of such heat being wasted by discharging the exhaust gas through the tailpipe 27 at a higher temperature. The size of the passages for the compressed air through the gas turbine in the manner described should be selected carefully to provide proper flow of air consistent with the heat extracted from it and subsequently supplied to it during its passage, bearing in mind that most of the air moving from the compressor 1 to the combustion chamber 2 passes through internal turbine blade passages.

An example of the temperature gradients of the compressed air and combustion gas flowing through the turbine will illustrate the heat exchange action of the structure described. At the discharge of the compressor 1 the temperature of the compressed air may be in the range of 350° to 400° F., depending upon the temperature of the air supplied to the compressor, and the speed of the compressor, but it is assumed that the compressor 1 is driven by turbine 3 at approximately its maximum speed so that the pressure of the air at the compressor discharge would be 55 to 60 pounds per square inch. As the compressed air passes through the passages 13 and the conduit 16 it is cooled so that as the air reaches the passages through the fixed and rotating blades of both turbines the temperature of the air will be in the range of 250° F. to 300° F.

The temperature of the combustion gas discharged from the combustion chamber 2 is approximately 1800° F., and its pressure will be approximately 55 pounds per square inch. During flow of the combustion gas through the compressor turbine 3 and the power turbine 4 to the tailpipe 27 the temperature will be reduced to approximately 1150° F. and the pressure will be reduced to 15 to 16 pounds per square inch. The loss of potential energy represented by the reduction in temperature and pressure will principally be transformed into mechanical energy to effect rotation of the turbines by reaction between the fixed blades 40 and rotatable blades 43 of the turbine 3, and the fixed blades 51 and rotatable blades 52 of the turbine 4. In addition a substantial amount of heat removed from the combustion gas is transmitted to the walls of the turbine blades to heat the compressed air passing through the hollow interior of such blades to effect cooling of them. Such heat transfer will increase the temperature of the cooling air in the common air chamber or passage 20 to approximately 400° F. to 450° F.

The cooling effect of the compressed gas flowing through the interior of the hollow stationary and rotary turbine blades will reduce the average wall temperature of these blades to approximately 800° to 900° F. The blades toward the discharge end of the turbine 4 will be of substantially lower temperature. A liquid coolant, such as water or other suitable liquid, may be utilized to supplement the cooling effect of the compressed air flowing through the hollow interior of the blades. For this purpose liquid coolant may be forced by a pump from nozzles 58 arranged in circumferentially spaced relationship around the cooling air supply casing 18 directed into the passage of the last row of the rotating blades of the turbine 4. As the coolant vaporizes from atomized condition it will absorb considerable heat and be carried with the compressed air into the combustion chamber 2. Additionally, all of the air which passes through the cooling passages may be humidified generally by the supply of water or other suitable liquid coolant the supply of which is controlled by a carburetor 58'.

It may be desirable to supply detergent to the cooling passages through the stationary and rotary turbine blades periodically, and for this purpose additional nozzles 59 may be mounted in the casing 18 in positions alternating with the nozzles 58 and directed to flow into the several passages through the stationary and rotary blades of the turbine 4. Similar detergent-ejecting spray nozzles 60 can be provided to spray detergent into the inlet passages 9 through which atmospheric air enters the centrifugal compressor 1. Control apparatus (not shown) may be provided to effect ejection of detergent from the nozzles 59 and 60 automatically at predetermined intervals, or such detergent may be ejected at will by voluntary control mechanism.

In operation of the gas turbine shown in FIG. 3 at approximately maximum speed, if the centrifugal compressor 28 has a compression ratio of approximately four to one, the temperature of the air at the discharge from such compressor would be between 350° F. and 400° F., and the pressure would be between 55 and 60 pounds per square inch. During movement of this air through passage 13', between the discharge of compressor 28 and the inlet of axial compressor 29, the air should be cooled to a temperature between 150° and 200° F. by cooling such passage. If the compression ratio of the axial compressor 29 is four to one, the pressure of the air at the discharge end of this compressor would be between 230 pounds per square inch and 240 pounds per square inch, and the temperature of such air would be in the range of 550° F. to 600° F. The temperature of the air delivered from the axial compressor 29 to the second-stage compressor turbine 31 and the second-stage compressor turbine 30 would be lower than this value if the air is cooled appreciably during its compression by the axial compressor 29 and after it leaves such compressor and before it enters the turbine rotor chambers.

As in the case of the gas turbine shown in FIGURE 1, the mean temperature of the combustion gas discharged from the combustion chamber 33 will be approximately 1800° F., but because of the higher pressure of the compressed air supplied to the combustion chamber the pressure of such combustion gas will be approximately 230 to 235 pounds per square inch. As a result of the transformation of heat and pressure energy of the combustion gas to mechanical energy effected by high speed rotation of the second-stage compressor driving turbine 31 and the heating of the air passing through the internal passages in the blades of this turbine, the temperature of the combustion gas at the discharge of such turbine will be approximately 1200° F. and the pressure will be from 125 to 130 pounds per square inch. The temperature and pressure of the combustion gas will be reduced further as it flows through the low speed first-stage compressor driving turbine 30. Such gas discharged through the tailpipe would be cooled to a temperature of 600° F. to 650° F., and the pressure of the combustion gas being discharged will be reduced to a range of 15 to 16 pounds per square inch.

In order to maintain the temperature of the turbine blade walls at an average temperature within the range of 900° F. to 1000° F. the temperature of the cooling air passed through the interior of the turbine blades will be increased drastically, such as from the range of 225° F. to 250° F., mentioned above as the temperature of air entering the turbine rotor passages to the temperature in the passage or chamber 32 in the range of 800° F. to 900° F. In this chamber the pressure of the compressed air will still be within the range of 230 pounds per square inch to 235 pounds per square inch, at which pressure the air will enter the annular combustion chamber 33 through its reticulated walls and through the primary air passage 34. The thermal efficiency attained would be 40% to 45% and the specified fuel consumption would be 0.31 to 0.35 pound per horsepower hour.

The manner in which flow of compressed air through the hollow stationary and rotary turbine blades effects cooling of the blade walls has been discussed generally in connection with FIGURE 1, but typical turbine rotor structure and associated stator structure is shown in greater detail in FIGURES 5, 6 and 7 of the type utilized in the gas turbine of FIGURE 3, but following the same general principles as used in the corresponding structure shown in FIGURE 1. Consequently corresponding parts have for the most part been designated by corresponding numbers primed.

In FIGURES 5, 6 and 7 fragmentary portions of the turbine rotor and the adjacent parts of the stator at the discharge end of the low speed first-stage compressor driving turbine 30 are shown. Passages for the compressed air through the thin walled turbine blades 52' communicate with the air supply passages 50' turning from an axial direction to a radial direction, as shown in FIGURES 3 and 7, to lead into the passages through the blades 52', as shown in FIGURE 6. The adjacent portion of the stator is formed as a grid of circumferential dividers 56' and axial dividers 49', shown best in FIGURE 5 and in detail in FIGURES 6 and 7. As the rotor turns, the compressed air supplied through the turbine rotor passages 50' is accelerated by centrifugal force as it moves through the hollow blades and is discharged between the axially extending dividers 49'. These dividers are curved, as shown in FIGURES 5 and 6, to direct the flow of the air from circumferential to radial with the least disturbance.

The circumferential dividers 56', as shown in FIGURES 3 and 7, separate the flows of compressed air passing through the passages of the rotary turbine blades 52' and the stationary turbine blades 51'. Although the passages through both types of blades are supplied with compressed air by the turbine rotor passages 50', the flow of air through the rotary blades will be accelerated by centrifugal force as the turbine rotor rotates as mentioned above. As such air continues to move at higher velocities through the passages in the stator between dividers 56', such flow will have an aspirating effect on the adjacent passages of the grid through which air from the stationary turbine blade passages is discharged. Consequently by such aspirating effect the flow of air through the interior of the stationary blades will also be accelerated.

The action of the air flowing through the interior of the rotary turbine blades 43' of the high speed secondary compressor driving turbine 31 will be accelerated in the same manner, but to a greater extent because of the higher speed of the turbine rotor. In the same way such airflow will therefore accelerate the flow of air through the stationary turbine blades 40' of the turbine 31 by the aspirating effect of the air flowing through the rotary blades 43'. Also the higher speed at which the air is discharged through the passages form the first stage 31 will tend to accelerate to some extent the entire movement of the air through the chamber 32 to the combustion chamber 33, including the flow of air discharged from the second stage turbine.

Figure 13:
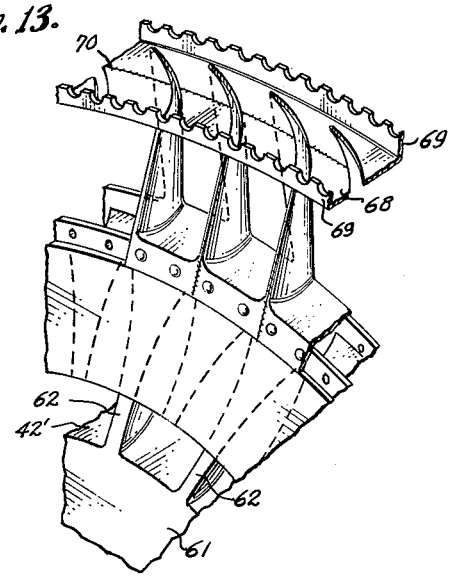
FIGURE 13 is a top perspective of a portion of a turbine rotor, with its parts in assembled relationship.
Figure 15:
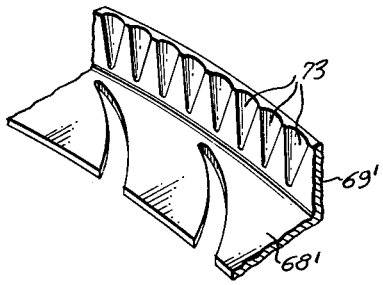
FIGURE 15 is a top perspective of a fragment of one component of the turbine rotor showing an alternative form.
Figure 14:
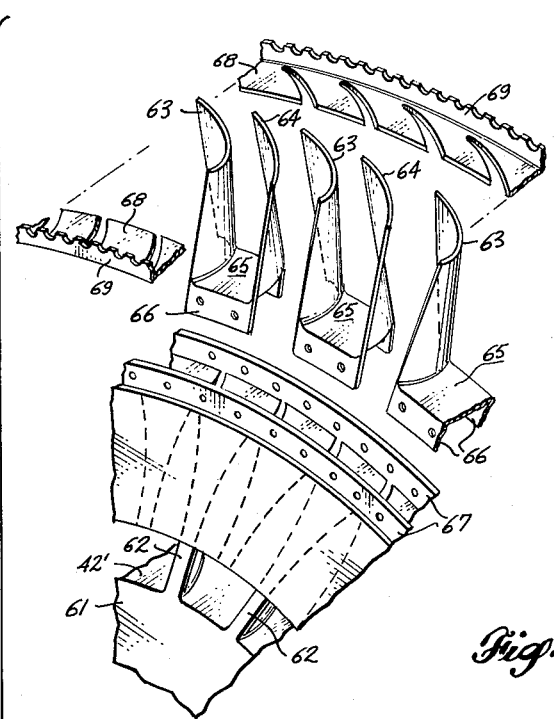
FIGURE 14 is a top perspective of such turbine rotor structure with parts shown in exploded relationship.

It will be understood that in order to provide a rapid and efficient transfer of heat from the combustion gas to the compressed air flowing through the hollow turbine blades it is desirable for such blades to be made of material which conducts heat readily and which is capable of being used to construct turbine blades having thin walls. It is also desirable to provide a turbine blade construction which is hollow, yet which is economical to manufacture. The walls of the turbine blades will therefore be made of sheet material, and preferably of metal having high heat conducting ability. In FIGURES 13, 14 and 15 a preferred type of turbine rotor structure having hollow rotating blades is illustrated. The various parts of this construction can be cut and bent to shape from flat metal sheets, or they can be cast or forged in the desired shape with or without internal ribs.

The turbine wheel 61, shown in FIGURES 13 and 14, which may be of the same general type of structure for either turbine 30 or turbine 31, is cast to provide a central massive hub portion from which the partitions 62 extend radially outward to form between them the passages 42' through which air may flow first axially and then radially to the passages through the hollow blades. The turbine blades are formed from deep channels of sheet material which, as mentioned above, can be bent, cast or forged into the desired shape. The sides 63 and 64 of these channels are curved in different degrees, and are twisted so that when the channel members are assembled with the concave side 63 of a channel member of sharper curvature disposed adjacent to the convex side of a channel member 64 of more gradual curvature, a passage of somewhat crescent shape in cross section will be formed through the interior of a hollow blade. The channel sides are supported in spaced relationship by the web portions 65 of the channel members which have inwardly projecting parallel flanges 66 on their opposite edges of a size and shape to fit peripheral flanges 67 of the turbine wheel.

The channel elements shown separately in FIGURE 14 can be assembled on the periphery of the turbine wheel as shown in FIGURE 13, utilizing long rivets to secure the flanges together. The abutting edges of the channel element sides can be welded together, as indicated in FIGURE 13. The outer ends of the turbine blades thus formed can be interconnected by a rim having a web 68 provided with apertures of a shape and located to match the outer ends of the passages through the turbine blades. Opposite edges of this rim have flanges 69 projecting outwardly, which stiffen the rim and may fit into grooves in the adjacent portion of the stator, as shown in FIGURE 7, to assist in sealing the rotor periphery. Such a rim can be formed in two parts, as shown in FIGURE 14, and these parts can be secured together by a welded seam 70 connecting their abutting edges as shown in FIGURE 13, and the ends of the turbine blades can abut the web 68 and be welded to it, or project into the apertures of the web and be welded to the web at its outer side.

The edge flanges 69 of the turbine rotor rim, shown as projecting into annular grooves of the stator in FIGURE 7, may have scalloped edges, as shown in FIGURES 13 and 14, which will impel outward air which would tend to flow from the grid passages between the dividers 46' and 49' or 56' and 49' toward the lower pressure region through which the combustion gas passes. The web 68 of the rotor rim prevents direct passage of compressed air to the path of combustion gas through the turbines, so that it would be necessary for air flowing into such path to pass under a skirt 71 of the stator and then over a flange 69 in order to reach the combustion gas path. During such passage the projections of the scalloped rim flanges 69 would impel such compressed air to flow back into the openings of the grid through ducts 72 provided through the dividers 56' at the bases of the skirts 71.

In FIGURE 15 an alternative type of rim section is shown in which the flanges 69' projecting outwardly from the web 68' instead of having scalloped edges, have inwardly tapered flutes 73 in them, and such edge flanges are shown in FIGURE 7. The function of such fluted flanges is the same as the function of the scalloped flanges shown in FIGURE 13. The impelling action of such fluted or scalloped flanges tends to return to ducts 72 any compressed air which may leak under the skirts 71 of dividers 56' to reduce as far as possible leakage of air around the flanges 69 and into the path of combustion gas flowing through the turbine. This same type of turbine rotor edge construction can be used for both of the turbines 30 and 31 in FIGURE 3, and for both of the turbines 3 and 4 in FIGURE 1, but is of more importance in the gas turbine of FIGURE 3 where the difference in pressure between the compressed air flowing through the turbine blades and the pressure of the combustion gas flowing through the turbine is greater. Such an impeller flange may also be provided on the turbine rim 69' in FIG. 7 inwardly of blades 52' for the same purpose.

In FIGURE 7 an additional expedient is provided to reduce the leakage of compressed air from the stator grid passages past the outflow side of the rotor of turbine 30, where the difference in pressure between the compressed air flowing through the stator passages and the combustion gas flowing through the turbine is the greatest. Around the inner periphery of the stator, adjacent to the rotor, is an annular edge 74 forming an acute angle at a location spaced radially inwardly somewhat from the inner periphery of the rim 68. This edge serves as a flow divider deflecting a portion of the exhaust gas from its path of flow generally axially through the turbine to an outward flow between the rotor flange 69 and the adjacent base portion of divider 56'. The portion of the combustion gas thus deflected would flow in a direction opposite that of compressed air tending to leak past the flange 69, and would therefore deter such opposing flow of compressed air toward the combustion chamber path.

Leakage of combustion gas from its path of flow axially through the turbine inwardly is deterred by providing interfitting annular projections and grooves on the rotor and stator inwardly of the bases of the turbine blades, designated 75 in FIGURE 7. Such interfitting ribs and grooves simply provide a tortuous path through which it is more difficult for combustion gas to escape. The smaller the clearance between such ribs and grooves the more effective the seal would be, of course, but ample clearance must be left between the ribs and grooves to prevent binding of these parts resulting from expansion of the parts caused by an increase in temperature of the turbine rotor or stator, or both.

Particularly in a gas turbine having plural compressors the effectiveness of cooling the turbines by use of air compressed by the turbines in course of its flow to the combustion chamber will be increased susbtantially if the air compressed by the first compressor is cooled by an intercooler arrangement before it is supplied to the next compressor. In FIGURE 3 such cooling action is shown as being accomplished by liquid coolant, which preferably is fuel burned in the combustion chamber 33 in somewhat the same way as described in connection with the turbine shown in FIGURE 1. Inwardly of the compressed air passage 13' is the coolant container 14', to which coolant is supplied and from which it is withdrawn to be cooled or to be used as fuel through connections 38. Ribs 15' which may extend generally axially of the gas turbine and project inwardly from the wall separating the passage 13' from the coolant container 14' can be provided to increase the heat radiating surface. Additional ribs or fins extending axially of the gas turbine may be supplied on the outer surface of this wall, if desired, to increase the surface through which heat from the compressed air is imparted to the wall.

In the gas turbine shown in FIGURE 1 the compressed air discharged from the compressor 1 is cooled only by coolant in the coolant container 14. Because of the compression of the air in the gas turbine of FIGURE 3 in two stages it is desirable to increase the cooling of the air between the discharge from compressor 28 and its inflow to compressor 29. For this purpose a cooling jacket 76 is provided around the outside of the compressed air passage 13', and preferably the outer wall of such passage has fins 77 projecting outwardly from it substantially axially of the gas turbine into the coolant space 78 within the jacket 76. This jacket may also envelop the second-stage compressor 29 and even extend beyond it in a direction axially of the gas turbine, as shown in FIGURE 3. Coolant in the space 79 enveloping the second-stage compressor will then have a cooling effect on the air being further compressed by such second-stage compressor, and coolant in the additional space 80 may effect still further cooling on air passing through ducts 81 from the outlet of the compressor 29 to the passages 42' and 50' in the rotors of turbines 31 and 30.

Any suitable type of liquid coolant can be supplied to the annular coolant chamber 78, 79, 80 through a coolant supply top connection 82, and be withdrawn from such chamber through a bottom connection 83, as indicated by the arrows at the left of FIGURE 3. The liquid coolant would be pumped through such chamber and to an external cooler by a suitable pump located in housing 84 and driven by gearing 85 from the shaft connecting the low-speed compressor driving turbine 30 and the compressor 28. If the coolant were fuel, part of such coolant would be sprayed by the nozzles 35 into the combustion chamber and the rest would be cooled and returned to the coolant chamber. The amount of coolant supplied to and withdrawn from the coolant container 14' and the coolant chamber 78, 79, 80 will depend upon the degree of cooling desired. Also the cooling effect can be facilitated by provision of ribs on the passage 81 to increase the contact surface between the compressed air passages through which the air is discharged from the compressor 29 and the portion 80 of the coolant chamber.

While in the turbines shown in FIGURES 1 and 3 liquid coolant is used for the purpose of cooling the compressed air discharged from the compressor or compressors, FIGURES 8, 9, 10 and 11 illustrate a gas turbine construction somewhat similar to that of FIGURE 3, but in which air is used as the coolant to cool the air compressed by the compressor or compressors. In FIGURES 8 and 9 a construction is shown in which air is used to cool the air compressed by a centrifugal compressor, and this type of construction can be used in conjunction with the centrifugal compressor 1 of FIGURE 1, or the centrifugal compressor 28 of FIGURE 3. Because of the similarity of the construction shown in FIGURES 8 and 9 to that of FIGURE 3 in various respects corresponding portions of the structure shown in FIGURES 8 and 9 have been numbered the same as in FIGURE 3, and these parts need not be described further. In this construction an air inlet shell 86 extends from the cooling jacket 76 axially beyond the turbine intake 33 and spaced a substantial distance radially outward from such turbine inlet to form an annular air inlet passage of considerable size.

An extension 87 is provided on the shaft driving the centrifugal compressor impeller 32 on which a cooling air propeller 88 is mounted, of a length substantially equal to the internal diameter of the shell 86. Rotation of this propeller will draw air both into the air intake of the centrifugal compressor 28 to increase its efficiency and into the shell 86 for cooling purposes. From the outer portion of the shell 86 such cooling air can flow directly to the coolant chamber 78 through the openings 78' shown in FIGURE 9. Such air will flow from the chamber 78 back to and through the chamber 79 shown in FIGURE 10, which is connected to the chamber 78 as shown in FIGURE 3.

Figure 10:
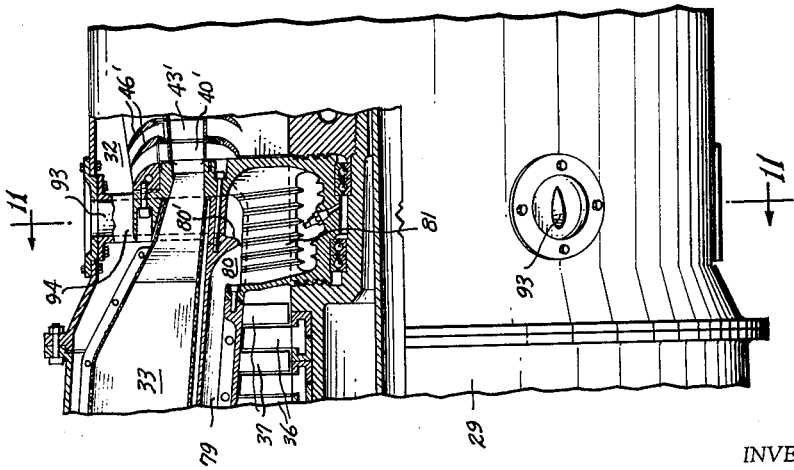

Cooling air supplied to the coolant chamber 78 from the cooling air inlet shell 86 will effect initial cooling of the air being compressed by the compressor 29 as it passes through the chamber 79, shown in FIGURE 10. In the coolant chamber 80 the air will additionally cool the air compressed by compressor 29 flowing through the passages 81, which are provided with radiating ribs, as shown in FIGURE 10. The cooling air will be discharged from the bottom passage 91 shown in FIG. 8.

Alternatively such air may be deflected by inward projections 80' from passage 80 to flow inward completely around the compressed air ducts 81, and finally be discharged to the atmosphere through radial passages 93 in struts 94. The amount of cooling air flowing through the coolant container 14' in the coolant chambers 78, 79 and 80 will, of course, depend upon the design and speed of rotation of the propeller 88. The cooling air entering the passages 78' will be heated progressively as it moves through the coolant chambers 78, 79 and 80, but the cooling effectiveness of such air will be largely maintained because, as mentioned above, the temperature of the compressed air discharged from the second stage compressor 29 will be greater than the temperature of the air discharged from the first-stage compressor 28.

Cooling air is used as the coolant in the inner coolant container 14' in this instance as well as in the outer coolant chamber instead of using liquid coolant. Cooling air is supplied to the coolant container 14' from the inlet shell 86 through passages 89 extending axially between diffusers between the compressor discharge and the flow redirecting vanes 12', as shown best in FIGURE 9. Air is discharged from the coolant container 14' through passages 90 at the side of the gas turbine opposite the air inlet passages 89, and these passages discharge through a bottom outlet 92 shown in FIGURE 8, which is separated by a partition from the outlet opening 91 of the outer coolant passage. The propeller 88 will therefore effect a continual flow of cooling air into the coolant container 14' through the inlet openings 89 and such air will be discharged through the outlet openings 90 and discharge duct 92 after being heated by heat transferred to such air through the walls of the coolant container and fins 15' from the compressed air in passage 13'.

If greater cooling effect should be desired for the single compressor gas turbine of FIGURE 1, both sides of the passage 13 can be cooled, either by liquid coolant as shown in FIGURE 3, or by cooling air as shown in FIGURE 8. Such greater cooling effect may be desirable in order to be able to use less expensive material for the turbine blades, which is reliably strong enough only at quite low temperatures. The turbine wheel materials are also stronger at such lower temperatures.

By use of the construction described above both the stationary and rotating turbine blades can be cooled effectively by air compressed by a turbine-driven compressor or compressors with minimum loss of such air to the combustion gas flowing through the turbine or turbines. Instead, virtually all the air used for cooling purposes which has been compressed will be delivered to the combustion chamber. Greater cooling of the turbine blades can be produced by cooling the compressed air following compression, whether such air is compressed in one or two stages.

Gas turbines utilizing the turbine blade cooling construction described above, particularly if the air used for cooling such blades is cooled after compression, have thermodynamic advantages over conventional gas turbines, as follows:

(1) Because of the abundance of air available for cooling the stationary blades and rotary blades of the turbines, combustion gas having exceptionally high temperature can be used.

(2) The useful reduction in temperature of the combustion gas flowing through the turbines can be increased in two ways:

(a) by increasing the initial temperature of the combustion gas supplied to the turbines;

(b) by decreasing the temperature of the combustion gas discharged from the turbines after expansion.

(3) By conserving the heat removed from the combustion gas by the cooling air in using such air in the combustion chamber, resulting in less fuel being required to attain the desired turbine inlet temperature.

(4) By amply cooling the stationary and rotary turbine blades the temperature drop of the combustion gas passing each row of turbine blades is increased, so that a given reduction in temperature of the combustion gas can be obtained by passing the combustion gas through a fewer number of turbine blade rows than would be required if the turbine blades were not cooled.

(5) By heating compressed air for combustion in passing it through the hollow turbine blades, a greater heat exchange efficiency is obtained than is possible by the use of a heat exchanger located at the discharge side of the turbines, because (a) the resistance to flow of both the combustion gas and the compressed air is less for such air passing through the turbine blades than through such a heat exchanger;

(b) the rotation of the turbine blades accelerates movement of the cooling air through their passages, and further produces an aspirating effect on the cooling air passing through the stationary turbine blades;

(c) the difference in temperature between the combustion gas and the compressed air is greater at the location of the turbines than at the discharge side of the turbines;

(d) the high velocity of the combustion gas adjacent to the inlet of the turbines and the higher velocity of the air going through the hollow blades increases the heat exchange effectiveness.

(6) The advantage of utilizing effective turbine blade cooling is not reduced even if materials capable of withstanding much higher temperatures are used, because the blade cooling will simply enable combustion gas having a much higher temperature to be supplied to the turbine inlet, thus increasing the efficiency of the gas turbine operation.

(7) The higher operating efficiency is obtained by cooling the turbine blades by use of a construction which is light and compact, and which is suitable for use in gas turbines employed either in stationary installations or for vehicle propulsion.

If it is desired to reduce still further the temperature of the combustion gas after it has passed through both turbines further heat can be extracted from the combustion gas by providing a small heat exchanger in the exhaust manifold downstream from the second turbine as shown in FIGURE 1. Cooling air supplied to the casing 18 through the pipe 16 can flow not only into the passages 50 in the rotor 4, but also through the tube 95 extending radially through the annular exhaust gas manifold from the compressed air manifold 18 to the annular passage 20 encircling the turbines. Two rows of such tubes are shown, the tubes of one row being offset circumferentially from the tubes of the other row to afford greatest contact of the combustion gas with such heat exchanger tubes.

While representative forms of gas turbines embodying the invention have been illustrated, it will be understood that the principles of the invention are applicable to different types of gas turbine construction, and that such principles may be utilized in various types of application within the spirit of the invention as defined in the appended claims.

I claim as my invention:

1. A means for cooling blading of a gas turbine comprising a hollow casing having a grid formed by a plurality of axially extending members and a plurality of axially spaced circumferential extending members crossing said axially extending members, a rotor having hollow blades mounted for rotation in said casing, stationary hollow blades in said casing adjacent said hollow rotor blades and mounted between a first pair of adjacent axially spaced circumferential extending members and said hollow rotor blades adjacent thereto mounted between a second pair of adjacent axially spaced circumferential extending members, and passage means conducting compressed cooling air to the radially inner ends of said stator blades and said rotor blades whereby the rotor on rotation thereof further energizes the compressed air supplied to said hollow rotor blades by centrifugal action which improves the flow through the adjacent stator blades by aspiration.

2. The gas turbine defined in claim 1, in which the axially extending members of the grid are of curved cross section, each such member having a concave surface toward which the turbine rotor blades turn and a convex surface away from which the rotor blades turn.

3. In a gas turbine, a rotor wheel, turbine blade means including a plurality of channel members having web portions secured to the periphery of said rotor wheel and flange portions joined respectively to adjacent flange portions of adjacent channel members, said joined flange portions forming hollow blades, a rim encircling the outer ends of said hollow blades and joined to such blade ends, said rim being of channel cross section including outwardly projecting flanges having blower means thereon, and a hollow casing having annular grooves in the hollow thereof opening inward, spaced apart axially and respectively embracing said outwardly projecting rim flanges.

References Cited by the Examiner

UNITED STATES PATENTS

| 1,530,249 | 3/1925 | Eveleth | 253—77 |
|---|---|---|---|
| 2,221,684 | 11/1940 | Smith | 253—77 |
| 2,347,034 | 4/1944 | Doran | 253—77 |
| 2,604,298 | 7/1952 | Bachle | 253—39.15 |
| 2,647,368 | 8/1953 | Thiebbnigg et al. | 253—39.15 |
| 2,779,565 | 1/1957 | Bruckmann | 253—39.15 |
| 2,786,646 | 3/1957 | Grantham | 253—39.15 |
| 2,795,928 | 6/1957 | Huebner | 60—39.16 |
| 2,891,382 | 6/1959 | Broffitt | 60—39.66 |
| 2,969,644 | 1/1961 | Williams | 60—39.16 |
| 3,015,937 | 1/1962 | Giliberty | 60—39.66 |
| 3,034,298 | 5/1962 | White | 60—39.66 |

FOREIGN PATENTS

| 983,333 | 2/1951 | France. |
|---|---|---|
| 1,033,849 | 4/1953 | France. |
| 576,218 | 3/1946 | Great Britain. |
| 742,476 | 12/1955 | Great Britain. |

SAMUEL LEVINE, *Primary Examiner.*

SAMUEL FEINBERG, MARK NEWMAN, HENRY F. RADUAZO, *Examiners.*

G. L. PETERSON, *Assistant Examiner.*